United States Patent
Levisse et al.

(10) Patent No.: US 11,988,136 B2
(45) Date of Patent: May 21, 2024

(54) TURBOMACHINE HAVING A CONTRAROTATING TURBINE FOR AN AIRCRAFT

(71) Applicants: SAFRAN AIRCRAFT ENGINES, Paris (FR); SAFRAN TRANSMISSION SYSTEMS, Colombes (FR)

(72) Inventors: Paul Ghislain Albert Levisse, Moissy-Cramayel (FR); Olivier Belmonte, Moissy-Cramayel (FR); Romain Truco, Moissy-Cramayel (FR); Olivier Formica, Moissy-Cramayel (FR); Fabrice Joel Luc Chevillot, Moissy-Cramayel (FR); Clement Paul Rene Niepceron, Moissy-Cramayel (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 17 days.

(21) Appl. No.: 17/756,501

(22) PCT Filed: Dec. 8, 2020

(86) PCT No.: PCT/FR2020/052348
§ 371 (c)(1),
(2) Date: May 26, 2022

(87) PCT Pub. No.: WO2021/116600
PCT Pub. Date: Jun. 17, 2021

(65) Prior Publication Data
US 2023/0011485 A1   Jan. 12, 2023

(30) Foreign Application Priority Data
Dec. 10, 2019   (FR) ...................................... 1914022

(51) Int. Cl.
*F02C 3/067* (2006.01)
*F02C 7/06* (2006.01)
(Continued)

(52) U.S. Cl.
CPC ................ *F02C 3/067* (2013.01); *F02C 7/06* (2013.01); *F02C 7/36* (2013.01); *F02K 3/06* (2013.01);
(Continued)

(58) Field of Classification Search
CPC .... F02C 3/067; F02C 7/06; F02C 7/36; F05D 2260/40311; F05D 2220/323; F05D 2240/54; F02K 3/06
See application file for complete search history.

(56) References Cited

U.S. PATENT DOCUMENTS 11,098,592 B2 *   8/2021   Pankaj ................... F01D 25/164
11,428,160 B2 *   8/2022   Kamat ....................... F02C 3/06
(Continued)

FOREIGN PATENT DOCUMENTS

| EP | 2975213 A1 | 1/2016 |
|----|------------|--------|
| EP | 3447243 A1 | 2/2019 |
| WO | 2013/147977 A1 | 10/2013 |

OTHER PUBLICATIONS

Robert E. Cunningham, Edgar J. Gunter, Jr and David P. Fleming, "Design of an Oil Squeeze Film Damper Bearing for a Multimass Flexible-Rotor Bearing System," NASA TN D-7892, Feb. 1975. (Year: 1975).*

(Continued)

*Primary Examiner* — David P. Olynick
(74) *Attorney, Agent, or Firm* — WOMBLE BOND DICKINSON (US) LLP

(57) ABSTRACT

A turbomachine having a contrarotating turbine for an aircraft, the turbomachine including a contrarotating turbine of which a first rotor is configured to rotate in a first direction of rotation and is connected to a first turbine shaft, and a (Continued)

second rotor configured to rotate in an opposite direction of rotation and connected to a second turbine shaft. The first rotor includes turbine wheels interleaved between turbine wheels of the second rotor, the turbomachine further including a planetary-type epicyclic mechanical reduction gear which has a sun gear driven in rotation by the second shaft, a ring gear driven in rotation by the first shaft, and a planet carrier attached to a first stator casing of the turbomachine located upstream of the contrarotating turbine with respect to a direction of flow of gas in the turbomachine. The turbomachine includes bearings for guiding the first and second shafts.

21 Claims, 3 Drawing Sheets

(51) Int. Cl.
*F02C 7/36* (2006.01)
*F02K 3/06* (2006.01)

(52) U.S. Cl.
CPC .... *F05D 2220/323* (2013.01); *F05D 2240/54* (2013.01); *F05D 2260/40311* (2013.01)

(56) References Cited

U.S. PATENT DOCUMENTS

| | | | |
|---|---|---|---|
| 2018/0223732 A1* | 8/2018 | Clements | F02C 3/067 |
| 2019/0085701 A1 | 3/2019 | Pankaj et al. | |
| 2019/0085722 A1* | 3/2019 | Pankaj | F02C 7/06 |
| 2021/0156257 A1* | 5/2021 | Pankaj | F01D 5/03 |

OTHER PUBLICATIONS

International Search Report and Written Opinion of the International Searching Authority dated Apr. 12, 2021 for related PCT Application No. PCT/FR2020/052348.

* cited by examiner

[Fig.1]
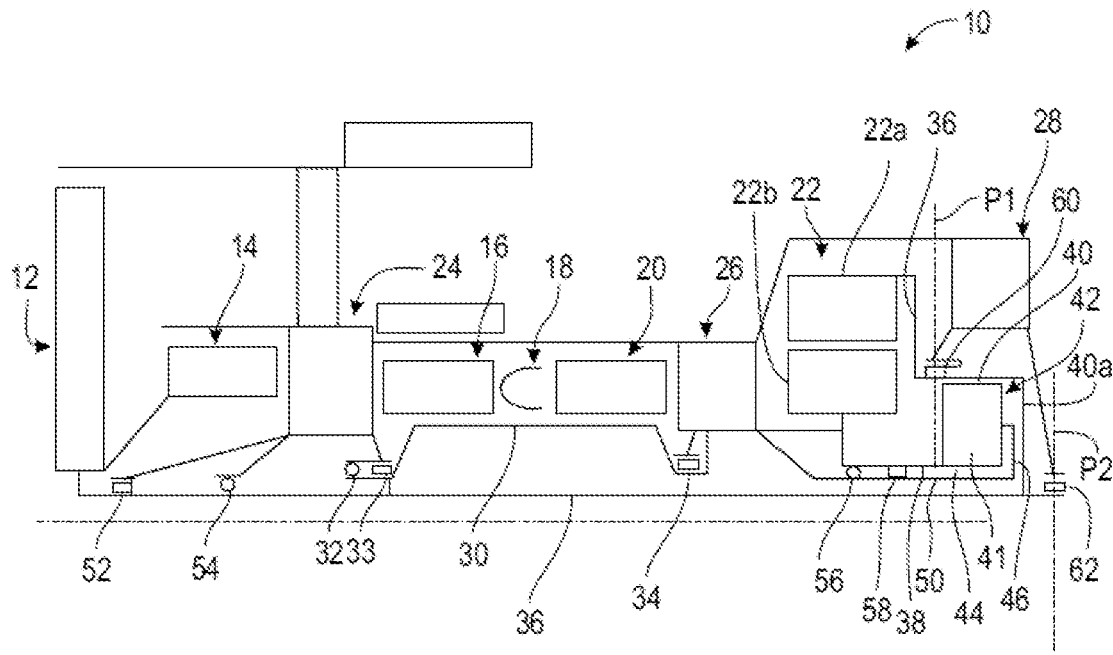
[Fig.2]
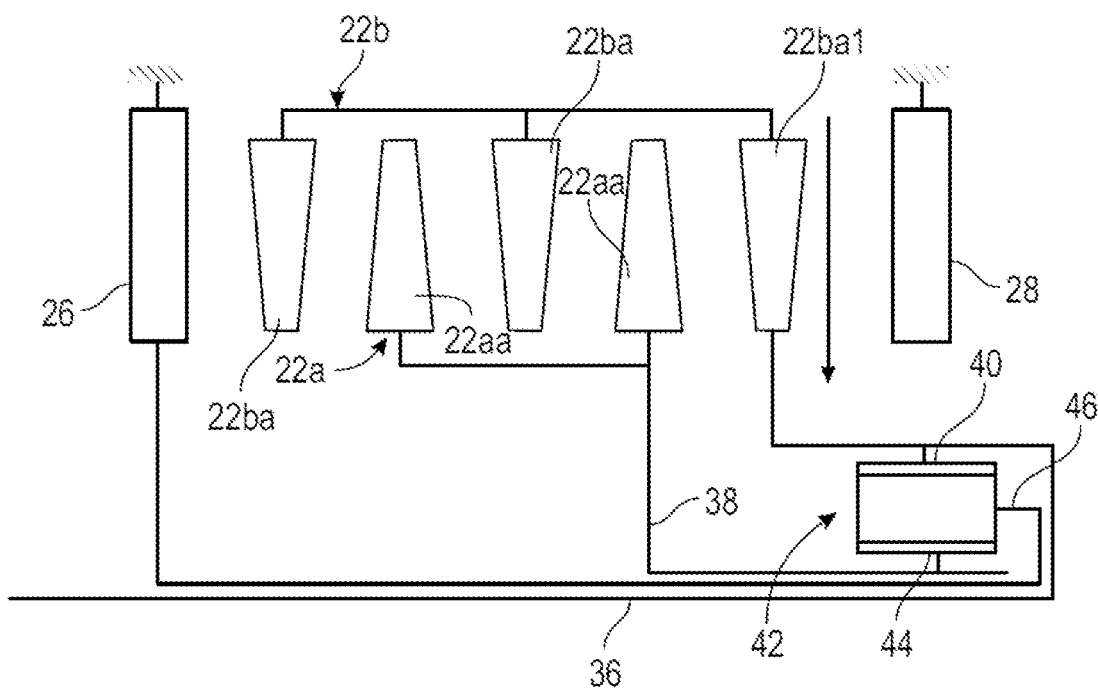

[Fig.3]
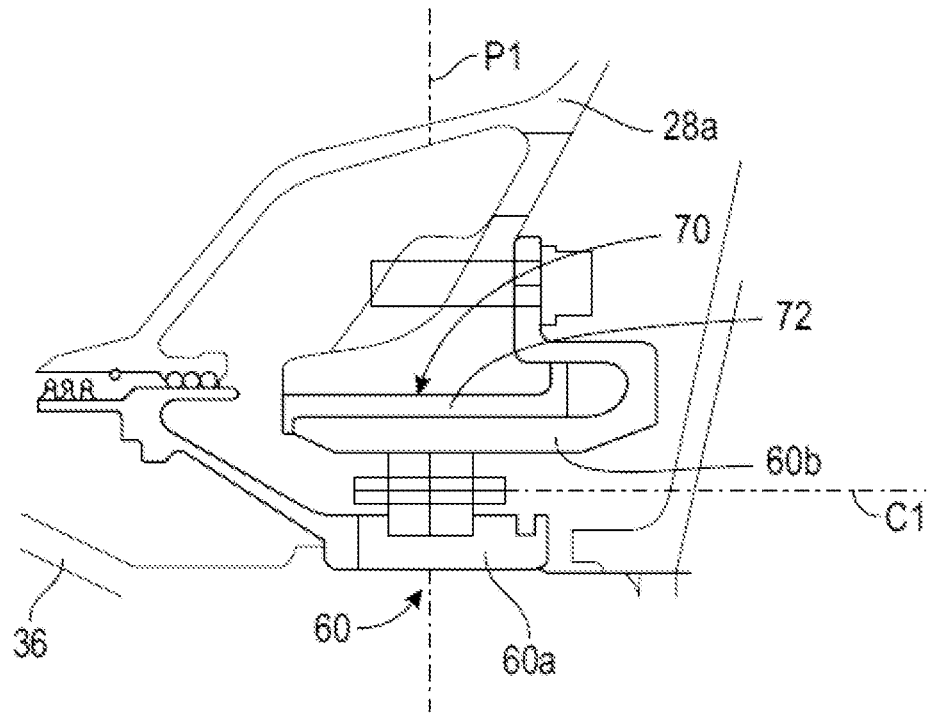
[Fig.4]
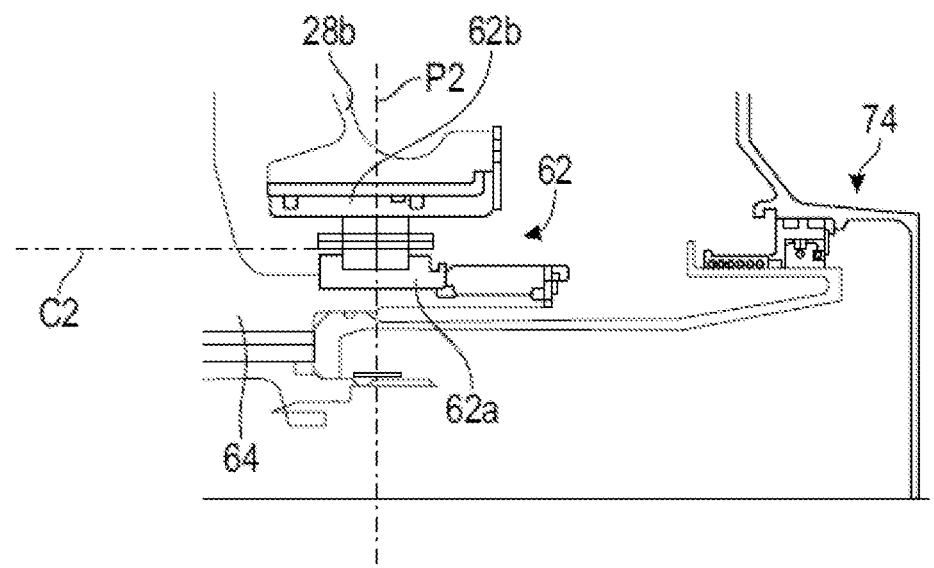

[Fig.5]
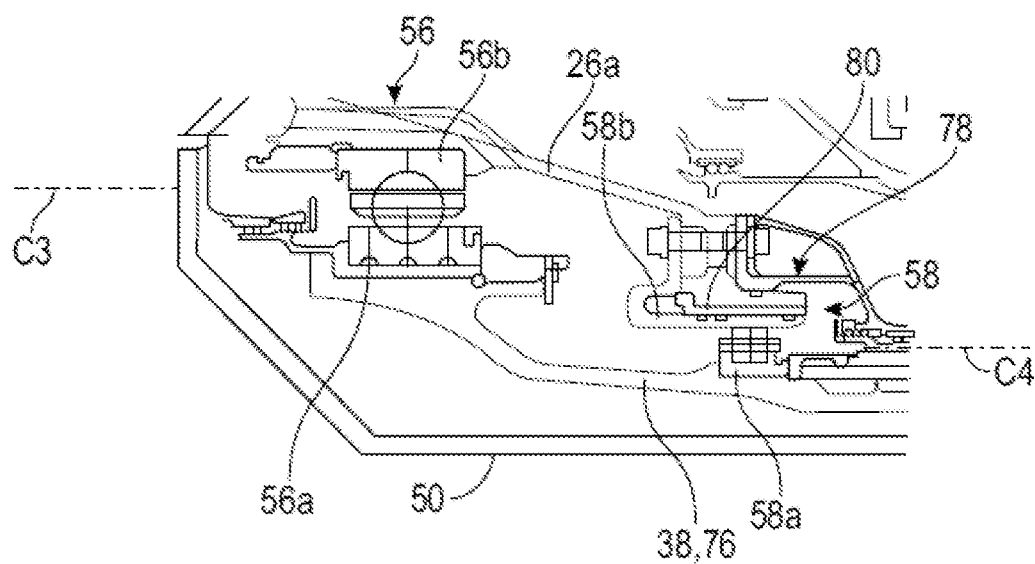

TURBOMACHINE HAVING A CONTRAROTATING TURBINE FOR AN AIRCRAFT

TECHNICAL SCOPE OF THE INVENTION

The present invention relates to a turbomachine having a contrarotating turbine for an aircraft.

TECHNICAL BACKGROUND

The prior art comprises, in particular, the documents US-A1-2019/085701, EP-A1-3 447 243, EP-A1-2 975 213 and WO-A1-2013/147977.

Conventionally, an aircraft turbomachine comprises from upstream to downstream, in the direction of flow of gas, a fan, a low-pressure compressor, a high-pressure compressor, an annular combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

From an engine performance and fuel consumption point of view, it is advantageous to maximise the rotational speed of the low-pressure turbine as this results in a higher turbine efficiency. However, increasing the rotational speed of the turbine means increasing the centrifugal forces on the turbine, and therefore greatly complicates its design.

One suggestion for increasing the efficiency of a turbine without increasing its rotational speed is to use a contrarotating turbine. The low-pressure turbine is replaced by a two-rotor turbine with a first rotor configured to rotate in a first direction of rotation and connected to a first turbine shaft, and a second rotor configured to rotate in an opposite direction of rotation and connected to a second turbine shaft. The first rotor has turbine wheels interposed between turbine wheels of the second rotor.

A low-pressure turbine may have a take-off rotational speed of the order of 4,000 rpm in a conventional architecture where the turbine drives the fan directly or a take-off rotational speed of the order of 10,000 rpm in an architecture where the turbine drives the fan through a reduction gear. Its replacement by a contrarotating turbine whose rotors rotate respectively at take-off speeds of the order of 3,000 and 7,000 rpm allows to have a relative speed of 10,000 rpm (3,000+7,000) while having an absolute speed in a low range of the above-mentioned speed interval.

This contrarotating turbine thus comprises a slow rotor and a fast rotor, the slow rotor driving the fan and the fast rotor meshing with a planetary-type epicyclic mechanical reduction gear whose input and output are contrarotating (rotating ring gear, fixed planet carrier, rotating sun gear).

The reduction gear couples the fast rotor to the slow rotor, allowing power to be transferred from the fast rotor to the slow rotor. This takes advantage of the higher efficiencies of a fast turbine while transferring a large part of the power from the turbine to the fan without passing through a reduction gear but through a shaft.

This architecture is complex because of its mechanical integration: the mechanical reduction gear is located downstream of the turbomachine, radially inside a stator casing called the exhaust casing.

The existing integration solutions are particularly complex because there are many inter-shaft bearings that are particularly difficult to lubricate. The radial loads of the turbines are likely to pass through the gearbox that holds the two shafts radially, which is extremely detrimental to the good behaviour of the reduction gear. Finally, the space requirement is not optimised, in particular with the presence of bearings under the planetary gear or sun gear of the reduction gear, which limits the radial integration of the reduction gear.

SUMMARY OF THE INVENTION

The present invention provides an improvement to the technology described above, which represents a simple, effective and economical solution to at least some of the above problems.

The invention proposes a turbomachine having a contrarotating turbine for an aircraft, the turbomachine comprising a contrarotating turbine of which a first rotor is configured to rotate in a first direction of rotation and is connected to a first turbine shaft, and a second rotor configured to rotate in an opposite direction of rotation and connected to a second turbine shaft, the first rotor comprising turbine wheels interleaved between turbine wheels of the second rotor, the turbomachine further comprising a planetary-type epicyclic mechanical reduction gear which comprises a sun gear driven in rotation by said second shaft, a ring gear driven in rotation by said first shaft, and a planet carrier attached to a first stator casing of the turbomachine located upstream of the contrarotating turbine with respect to a direction of flow of gas in the turbomachine, the turbomachine comprising bearings for guiding the first and second shafts, characterised in that said first shaft is guided by at least two guide bearings mounted between this first shaft and a second stator casing located downstream of the contrarotating turbine or an element connected to the latter, and said second shaft is guided by at least two guide bearings mounted between this second shaft and said first stator casing or an element connected to the latter.

Each of the two rotors of the free turbine is thus guided in rotation by two bearings as opposed to a single bearing in certain architectures of the prior art.

This solution is advantageous for the following reasons in particular:

the turbomachine is easier to assemble because of the centring provided during the assembly by the pairs of bearings for each of the first and second shafts, the reduction gear is better maintained under gravity and maneuvering because it can be framed by bearings carried by rigid force paths.

The turbomachine according to the invention may comprise one or more of the following features, taken in isolation from each other or in combination with each other:

said second shaft is guided by only two guide bearings;

the two guide bearings of the second shaft are an upstream ball bearing and a downstream roller bearing, respectively;

one of the two guide bearings of the second shaft, such as the downstream roller bearing, is associated with an oil film compression damping system;

the two guide bearings of the second shaft are located radially inside the first and second rotors; this is advantageous insofar as it allows to avoid a cantilever which generates significant consumption of clearance under manoeuvre, and also to better manage the dynamics of the turbine (absence of bending mode of the shaft of this turbine in the operating range, better possibility of damping the suspension modes of this turbine); moreover, in the case where these bearings are arranged respectively in line with the upstream and downstream stages of the turbine, the bearings would ensure better support of the latter;

said first shaft is guided by only two guide bearings;

a first guide bearing of the first shaft is located upstream of the reduction gear and a second guide bearing of the first shaft is located downstream of the reduction gear;

the first guide bearing of the first shaft is located in a first plane perpendicular to a longitudinal axis of the turbomachine, which passes downstream of said first and second rotors, and upstream of said reduction gear and said second casing, and said second guide bearing of the first shaft is located in a second plane perpendicular to this axis, which is located downstream of said reduction gear and said second casing;

the two guide bearings of the first shaft are roller bearings;

one of the two guide bearings of the first shaft, such as an upstream bearing, is associated with an oil film compression damping system;

said first shaft is connected to a downstream stage of said first rotor, and/or said second shaft is connected to a downstream stage of said second rotor; this allows the torque(s) to pass through the last rotor stage, which is much cooler than the first or upstream stage, at least one of the guide bearings of the first shaft is shaped to have some flexibility in the radial direction; this flexibility can be provided by an annular portion having a C-shaped cross-section of a ring of that bearing, at least one of the guide bearings of the second shaft is shaped to have some flexibility in the radial direction; this flexibility can be provided by an annular portion having a C-shaped cross-section of a ring of this bearing, at least one of the ring gear carrier and the planet carrier is shaped to have some radial flexibility as well as some tilting flexibility (flexibility in rotation about the axes perpendicular to the motor axis); this flexibility can be provided by an annular portion having a C-shaped or S-shaped cross-section of the ring gear carrier or of the planet carrier (if integrated in the ring gear carrier), this flexibility should preferably be integrated outside the force path going from the downstream end of the ring gear carrier to the bearing, said first shaft is connected to the ring gear of the reduction gear and to a drive shaft of a fan of the turbomachine, one of the guide bearings of the first shaft is located on a circumference which has a diameter greater than a circumference passing through the other of the guide bearings of that first shaft, and which is preferably greater than the outer diameter of the reduction gear, and the guide bearings of the second shaft are located on circumferences of different diameters, the downstream bearing being located on the smaller diameter circumference which may be smaller than the inner diameter of the reduction gear.

Advantageously, an oil film compression damping system is used to dampen dynamic unbalanced modes of a shaft or rotor.

Preferably, the turbomachine is of the type with a single ducted fan, the first shaft driving this single fan in rotation.

BRIEF DESCRIPTION OF THE FIGURES

The invention will be better understood and other details, characteristics and advantages of the invention will become clearer on reading the following description made by way of non-limiting example and with reference to the attached drawings in which:

FIG. 1 is a very schematic view of a turbomachine having a contrarotating turbine according to one embodiment of the invention, FIG. 2 is a larger scale view of the contrarotating turbine of FIG. 1, FIG. 3 is a schematic axial sectional view of a guide bearing of a shaft of the turbomachine of FIG. 1, FIG. 4 is a schematic axial sectional view of another shaft guide bearing of the turbomachine of FIG. 1, and FIG. 5 is a schematic axial sectional view of further guide bearings of a shaft of the turbomachine of FIG. 1.

DETAILED DESCRIPTION OF THE INVENTION

FIG. 1 shows in a very schematic manner a turbomachine 10 having a contrarotating turbine for an aircraft.

This turbomachine 10 comprises from upstream to downstream, in the direction of flow of gas, a fan 12, a low-pressure compressor 14, a high-pressure compressor 16, an annular combustion chamber 18, a high pressure turbine 20 and a contrarotating turbine 22.

The reference 24 refers to an intermediate casing located between the compressors 14 and 16, and the reference 26 refers to a turbine casing (of the TVF type, an acronym for Turbine Vane Frame which designates a turbine casing equipped with arms forming rectifier vanes) located between the turbines 20 and 22. Finally, the reference 28 refers to an exhaust casing (of the TRF type, which is an acronym for Turbine Rear Frame, which designates the last turbine casing). These casings form the structure of the turbomachine: they support the bearings that guide the rotating shafts and are linked to the suspensions of the turbomachine.

The rotor of the high-pressure turbine 20 drives in rotation the rotor of the high-pressure compressor 16 via a high-pressure shaft 30 which is centred and guided in rotation by bearings, such as an upstream ball bearing 32 and a downstream roller bearing 34. The bearing 32 is mounted between an upstream end of the shaft 30 and the intermediate casing 24, and the bearing 34 is mounted between a downstream end of the shaft 30 and the turbine casing 26.

The contrarotating turbine 22 comprises a first rotor 22a having wheels 22aa configured to rotate in a first direction of rotation and connected to a first turbine shaft 36, and a second rotor 22b having wheels 22ba configured to rotate in an opposite direction of rotation and connected to a second turbine shaft 38 and interleaved between the wheels 22aa of the rotor 22a (see FIG. 2).

Each turbine wheel comprises an annular row of blades, each of which has an aerodynamic profile with a pressure side and suction side that meet to form a leading edge and a trailing edge of the gases in the turbine stream.

The first shaft 36 drives in rotation the fan 12 and the rotor of the low-pressure compressor 14. This first shaft 36 is further meshed with a ring gear 40 of a planetary-type epicyclic mechanical reduction gear 42.

The second shaft 38 is meshed with the sun gear 44 or planetary gear of the reduction gear 42.

The reduction gear 42 further comprises sun gears 41 meshed with the sun gear 44 and the ring gear 40 respectively and carried by a planet carrier 46 which is attached to the turbine casing 26.

Each of the casings 26 and 28 generally comprises a central hub, and an outer annulus which surrounds the hub and is connected thereto by a series of arms substantially radial to the longitudinal axis of the turbomachine. The central hub of the casing 28 extends around at least part of the reduction gear 42.

In the example shown, the high-pressure shaft 30 is centred and guided in rotation by two upstream ball bearings 32 and roller bearings 33 respectively, and by a downstream roller bearing 34. The bearings 32, 33 are mounted between an upstream end of the shaft 30 and the intermediate casing 24, and the bearing 34 is mounted between a downstream end of the shaft 30 and the turbine casing 26.

The planet carrier 46 of the reduction gear 42 is attached to the turbine casing 26. The planet carrier 46 is thus connected to the turbine casing 26 by a cylindrical wall 50 which is advantageously rigid. This wall 50 passes axially through the rotors 22a, 22b and the second shaft 38.

The second shaft 38 has its downstream end meshed with the solar, as mentioned above, and is further connected to the last or downstream stage of the second rotor 22b, i.e. to the last wheel 22ba1 of this rotor.

The second shaft 38 is centred and guided in rotation on this wall 50 by means of two guide bearings, respectively upstream 56 and downstream 58. An example of the design of these bearings 56, 58 will be described in more detail in the following with reference to FIG. 5.

The first shaft 36 has its downstream end fixed to the ring gear 40 of the reduction gear and its upstream end fixed to the last stage or downstream stage of the first rotor 22a, i.e. to the last wheel of this rotor. The ring gear 40 is also fixed to the upstream end of a ring gear carrier 40a, the downstream end of which is fixed to or meshed with the downstream end of the shaft 36.

The planet carrier 46 may comprise, here on the downstream side of the reduction gear 42, an annular portion having a C- or S-shaped cross-section so as to confer on the planet carrier some flexibility by elastic deformation, in particular in the radial direction as well as in tilting (flexibility in rotation about the axes perpendicular to the motor axle). Because of this flexibility provided by the planet carrier 46, the ring gear carrier 40a of the reduction gear 42 can be rigid. The opposite is possible, under certain conditions. In this case, the ring gear carrier 40a would be flexible or provide flexibility, and the planet carrier 46 would be rigid. The ring gear carrier 40a would then comprise an annular portion having a C- or S-shaped cross-section so as to confer on the ring gear some flexibility by elastic deformation, in particular in radial direction as well as in tilting (flexibility in rotation about the axes perpendicular to the motor axis). In this second configuration, the flexibility is advantageously integrated outside the force path from the downstream end of the ring gear carrier 40a to the bearing 60.

The shaft 36 is guided upstream by bearings 52, 54 mounted between this shaft and the intermediate casing 24. A first of these bearings is, for example, an upstream roller bearing 52, and a second of these bearings is, for example, a downstream ball bearing 54.

The shaft 36 is also centred and guided in rotation downstream by two guide bearings, respectively upstream 60 and downstream 62. These bearings are advantageously placed on either side of the reduction gear 42. An example of the design of these bearings 60, 62 is described in more detail in the following with reference to FIGS. 3 and 4.

FIG. 3 illustrates a more detailed example of the guide bearing 60, for example with rollers. This bearing 60 is preferably located upstream of the reduction gear 42. More precisely, it may be located in a plane P1, perpendicular to the axis of the turbomachine, which is located downstream of the turbine 22, and upstream of the reduction gear 42 as well as the exhaust casing 28 (see also FIG. 1).

The bearing 60 comprises an inner ring 60a integral with the shaft 36, and an outer ring 60b integral with a shell 28a fixed to the casing 28. This shell 28a advantageously has a generally truncated conical shape flared towards the downstream end. This shell 28a forms a support for the bearing 60.

The bearing 60 is advantageously associated with an oil film compression damping system 70. In the example shown, this system 70 is present at the level of the outer ring of the bearing, between this ring 60b and the radially inner end of the shell 28a. An oil film is formed in an annular space extending between an outer cylindrical surface of the ring 60b and an inner cylindrical surface of an annulus 72 mounted around the ring, this space being supplied with oil by suitable means.

The outer ring 60b is further shaped to provide some flexibility to the bearing 60. In the example shown, one of its axial ends, in this case downstream, has a C or pin shape in axial cross-section which allows the ring 60b to be radially flexible by deformation.

FIG. 4 illustrates a more detailed example of the guide bearing 62, for example with rollers. This bearing 62 is preferably located downstream of the reduction gear 42. More precisely, it may be located in a plane P2, perpendicular to the axis of the turbomachine, which is located downstream of the reduction gear 42 as well as the exhaust casing 28 (see FIG. 1).

The bearing 62 comprises an inner ring 62a integral with the downstream end of the shaft 64, and an outer ring 62b integral with a shell 28b fixed to the casing 28. This shell 28b advantageously has a generally truncated conical shape flared towards the upstream end. This shell 28b forms a support for the bearing 62.

The bearing 62 participates in guiding the shaft 64, as mentioned above, but also the shaft 36 due to the connection of this shaft 36 to the shaft 64, in particular by means of the ring gear carrier 40a.

The shell 28b or a downstream axial extension of the shell 28b may cooperate with a dynamic seal 74 carried by the shaft 64 or an element attached to the downstream end of this shaft.

The bearing 60 is located on a circumference C1 which has a larger diameter than the circumference C2 where the bearing 62 is located.

FIG. 5 illustrates a more detailed example of the guide bearings 56, 58. The upstream bearing 56 is ball bearing and the downstream bearing 58 is roller bearing. These bearings are preferably located upstream of the reduction gear 42, and radially inside the turbine 22. The upstream bearing 56 may be located at the upstream end or the upstream stage of the turbine 22, and the downstream bearing 58 may be located at the downstream end or downstream stage of the turbine 22.

Each of the bearings 56, 58 comprises an inner ring 56a, 58a integral with an annular wall 76 fixed to the shaft 38, and an outer ring 56b, 58b integral with a shell 26a fixed to the casing 26. This shell 26a advantageously has a generally truncated conical shape flaring upstream. This shell 26a forms a support for the bearings 56, 58.

The bearing 58 is advantageously associated with a damping system 78 with oil film compression. In the example shown, this system 78 is present at the level of the outer ring 58b of the bearing 58, between this ring 58b and the radially inner end of the shell 26a. An oil film is formed in an annular space extending between an outer cylindrical surface of the ring 58b and an inner cylindrical surface of an annulus 80 mounted around the ring 58b, this space being supplied with oil by suitable means.

The outer ring 58b is further shaped to provide some flexibility to the bearing 58. In the example shown, one of its axial ends, in this case the upstream end, is C-shaped or pin-shaped in axial cross-section, which allows the ring 58b to be radially flexible by deformation.

The bearing 56 is located on a circumference C3 which has a larger diameter than the circumference C4 where the bearing 58 is located.

The invention thus proposes a turbomachine with contrarotating turbines and a reduction gear with a bearing positioning that allows to resolve the problems of dynamics, consumption of clearances under manoeuvre and misalignments, while proposing better mechanical integration of the various components.

The invention allows to solve or avoid several problems of the previous technique, including:
- a solution consisting of guiding each of the shafts by a single bearing is not satisfactory for the following reasons:
- the reduction gear is not, or is only slightly, subject to major misalignments, whether under gravity, manoeuvre or dynamics. This would create overloads in the meshing toothing, which would be detrimental to the design of the reduction gear (mechanical, mass);
- the reduction gear can be installed in a relatively flexible environment (flexibilities built into the planet carrier and input shaft to allow the reduction gear to accommodate displacements of the planet carrier and input shaft so as not to overload the toothing). This would require a space requirement that could be detrimental to the motor length;
- The fast rotor is not held by a single bearing, which could cause problems with its centring during assembly; this could also lead to significant consumption of interturbine clearance under maneuvering, which again would degrade the performance of this architecture;

etc.

The invention claimed is:

1. A turbomachine having a contrarotating turbine for an aircraft,
the turbomachine comprising a contrarotating turbine of which a first rotor is configured to rotate in a first direction of rotation and is connected to a first turbine shaft, and a second rotor configured to rotate in an opposite direction of rotation and connected to a second turbine shaft, the first rotor comprising turbine wheels interleaved between turbine wheels of the second rotor,
the turbomachine further comprising a first stator casing located upstream of the contrarotating turbine with respect to a direction of flow of gas in the turbomachine
the turbomachine further comprising a second stator casing located downstream of the contrarotating turbine with respect to said direction,
the turbomachine further comprising a planetary-type epicyclic mechanical reduction gear which comprises a sun gear driven in rotation by said second turbine shaft, a ring gear driven in rotation by said first turbine shaft, and a planet carrier attached to said a first stator casing,
the turbomachine comprising bearings for guiding the first and second turbine shafts,
wherein said first turbine shaft is guided by at least two of said guide bearings carried by said second stator casing, said at least two guide bearings being located downstream of the contrarotating turbine, a first of at least two guide bearings being located radially outward of the reduction gear and the second of at least two guide bearings located radially inward of the reduction gear and said second turbine shaft is guided by at least two guide bearings mounted between said second shaft and said first stator casing or an element connected to the latter.

2. The turbomachine according to claim 1, wherein said second turbine shaft is guided by only two guide bearings.

3. The turbomachine according to claim 2, wherein the two guide bearings of the second shaft are an upstream ball bearing and a downstream roller bearing respectively.

4. The turbomachine according to claim 2, wherein one of the two guide bearings of the second turbine shaft is associated with an oil film compression damping system.

5. The turbomachine according to claim 2, wherein the two guide bearings of the second turbine shaft are located radially inside the first and second rotors.

6. The turbomachine according to claim 1, wherein said first turbine shaft is guided by only two guide bearings mounted between said first turbine shaft and said second stator casing or said element.

7. The turbomachine according to claim 6, wherein a first guide bearing of the first turbine shaft is located downstream of the contrarotating turbine and upstream of the reduction gear, and a second guide bearing of the first turbine shaft is located downstream of the contrarotating turbine and of the reduction gear.

8. The turbomachine according to claim 7, wherein the first guide bearing of the first turbine shaft is located in a first plane perpendicular to a longitudinal axis of the turbomachine, which passes downstream of said first and second rotors, and upstream of said reduction gear and said second casing, and said second guide bearing of the first turbine shaft is located in a second plane perpendicular to the axis, which is located downstream of said reduction gear and said second casing.

9. The turbomachine according to claim 6, wherein both guide bearings of the first turbine shaft are roller bearings.

10. The turbomachine according to claim 9, wherein one of the two guide bearings of the first turbine shaft is associated with an oil film compression damping system.

11. The turbomachine according to claim 1, wherein said first turbine shaft is connected to a downstream stage of said first rotor, and/or said second turbine shaft is connected to a downstream stage of said second rotor.

12. The turbomachine according to claim 1, wherein at least one of the guide bearings of the first turbine shaft is shaped to have some flexibility in a radial direction.

13. The turbomachine according to claim 12, wherein the flexibility of at least one of the guide bearings of the first turbine shaft is provided by an annular portion having a C-shaped cross-section of a ring of that bearing.

14. The turbomachine according to claim 1, wherein at least one of the guide bearings of the second turbine shaft is shaped to have some flexibility in a radial direction.

15. The turbomachine according to claim 14, wherein the flexibility of at least one of the guide bearings of the second turbine shaft is provided by an annular portion having a C-shaped cross-section of a ring of that bearing.

16. The turbomachine according to claim 1, wherein at least one of the planet carrier and a ring gear carrier which supports the ring gear is shaped to have some radial flexibility as well as tilting flexibility.

17. The turbomachine according to claim 16, wherein the flexibility of said at least one of the elements is provided by an annular portion having a C- or S-shaped cross-section of that element.

18. The turbomachine according to claim 17, wherein one of the guide bearings of the first turbine shaft is located on a circumference which has a diameter greater than a circumference passing through the other of the guide bearings of that first turbine shaft.

19. The turbomachine according to claim 18, wherein the guide bearings of the second turbine shaft are located on circumferences of different diameters, the downstream bearing being located on the circumference of smaller diameter which is smaller than an inner diameter of the reduction gear.

20. The turbomachine according to claim 1, wherein said first turbine shaft is connected to the ring gear of the reduction gear and to a drive shaft of a fan of the turbomachine.

21. The turbomachine according to claim 20, which comprises a single ducted fan, the first turbine shaft driving the single ducted fan in rotation.

\* \* \* \* \*